United States Patent [19]

Inagami et al.

[11] Patent Number: 5,109,499
[45] Date of Patent: Apr. 28, 1992

[54] VECTOR MULTIPROCESSOR SYSTEM WHICH INDIVIDUALLY INDICATES THE DATA ELEMENT STORED IN COMMON VECTOR REGISTER

[75] Inventors: Yasuhiro Inagami, Manchester, England; Yoshiko Tamaki, Kunitachi; Katsuyoshi Kitai, Kokubunji, both of Japan

[73] Assignee: Hitachi, Ltd., Tokyo, Japan

[21] Appl. No.: 237,418

[22] Filed: Aug. 29, 1988

[30] Foreign Application Priority Data

Aug. 28, 1987 [JP] Japan ............... 62-212755

[51] Int. Cl.$^5$ ............................................. G06F 15/16
[52] U.S. Cl. ................................... 395/425; 364/247; 364/228.1; 364/229; 364/246.8; 364/DIG. 1; 364/736
[58] Field of Search ........ 364/736, 748, 200 MS File, 364/900 MS File

[56] References Cited

U.S. PATENT DOCUMENTS

| | | | |
|---|---|---|---|
| 3,940,743 | 2/1976 | Fitzgerald | 364/200 |
| 4,128,880 | 12/1978 | Cray | 364/200 |
| 4,128,881 | 12/1978 | Yamamoto | 364/200 |
| 4,563,738 | 1/1986 | Klan | 364/200 |
| 4,591,982 | 5/1986 | Buonomo | 364/200 |
| 4,598,362 | 7/1986 | Kinjo | 364/200 |
| 4,617,625 | 10/1986 | Nagashima | 364/200 |
| 4,636,942 | 1/1987 | Chen | 364/200 |
| 4,661,990 | 4/1987 | Chen | 364/200 |
| 4,780,811 | 10/1988 | Aoyama | 364/200 |
| 4,794,521 | 12/1988 | Ziegler | 364/200 |

FOREIGN PATENT DOCUMENTS 0105125 3/1982 European Pat. Off. .
57-91644 12/1983 Japan .

OTHER PUBLICATIONS

PCT/US82/01297, Oct. 5, 1981, Interface Mechanism Between Host Processor and Peripheral Controlling Processor.

12th Annual Intl. Symposium on Computer Arch., IEEE, Jun. 1985, MU6V: A Parallel Vector Processing System by Ibbett, R. N., pp. 136-144.

CRAY-1, the CRAY X-MP, the CRAY-2 and Beyond the Supercomputers of CRAY Research, J. Thompson, pp. 69-81.

*Primary Examiner*—Thomas C. Lee
*Assistant Examiner*—Eric Coleman
*Attorney, Agent, or Firm*—Antonelli, Terry, Stout & Kraus

[57] ABSTRACT

At least one common vector register capable of being accessed from a plurality of vector processors constituting the multiprocessor is provided in order to transfer vector data among the vector processors at a high speed. The common vector register includes data fields each holding the value of vector data, access control sections provided corresponding to the respective data fields and showing the status of data access from the vector processor for synchronization of data sending and receiving, when the vector data is transferred among the different vector processors through the common vector register, and an access right section used for managing the number of the vector processor which is allowed to access the common vector register.

45 Claims, 6 Drawing Sheets

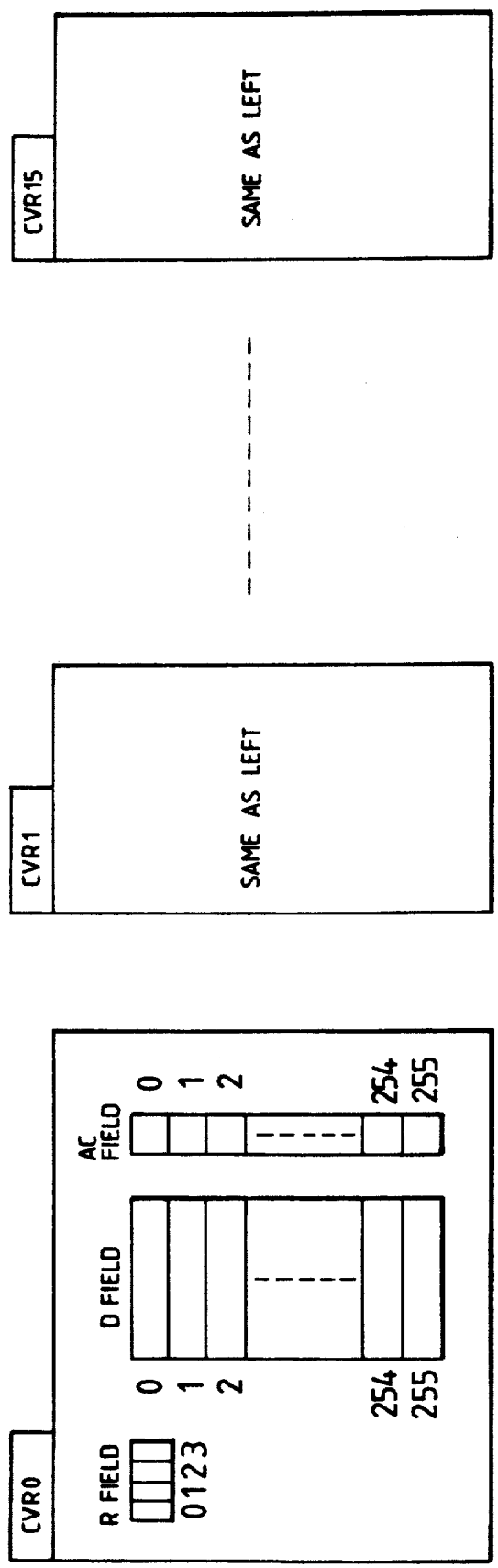

FIG. 5

AC0 FIELD

| VALUE | MEANING |
|---|---|
| 0 0 0 1 | ACCESS TO EACH ELEMENT OF THE DATA FIELD IS PERMITTED, WHEN THE STATUS OF THE CORRESPONDING ELEMENT OF THE ACCESS CONTROL FIELD IN THE SPECIFIED COMMON VECTOR REGISTER IS RESET.<br>WHEN THE STATUS IS SET, THE ACCESS IS NOT PERMITTED. |
| 0 0 1 0 | ACCESS TO EACH ELEMENT OF THE DATA FIELD IS PERMITTED, WHEN THE STATUS OF THE CORRESPONDING ELEMENT OF THE ACCESS CONTROL FIELD IN THE SPECIFIED COMMON VECTOR REGISTER IS SET.<br>WHEN THE STATUS IS RESET, THE ACCESS IS NOT PERMITTED. |
| 1 1 1 1 | ACCESS TO EACH ELEMENT OF THE DATA FIELD IS ALWAYS PERMITTED, REGARDLESS OF THE STATUS OF THE CORRESPONDING ELEMENT OF THE ACCESS FIELD IN THE SPECIFIED COMMON VECTOR REGISTER. |
| ALL OTHERS | UNUSED |

AC1 FIELD

| VALUE | MEANING |
|---|---|
| 0 0 0 0 | THE STATUS OF THE ACCESS CONTROL FIELD IS NOT CHANGED. |
| 0 0 0 1 | AFTER THE COMPLETION OF THE ACCESS TO THE DATA FIELD, THE STATUS OF CORRESPONDING ELEMENT OF THE ACCESS CONTROL FIELD IS MADE RESET. |
| 0 0 1 0 | AFTER THE COMPLETION OF THE ACCESS TO THE DATA FIELD, THE STATUS OF CORRESPONDING ELEMENT OF THE ACCESS CONTROL FIELD IS MADE SET. |
| ALL OTHERS | UNUSED |

VECTOR MULTIPROCESSOR SYSTEM WHICH INDIVIDUALLY INDICATES THE DATA ELEMENT STORED IN COMMON VECTOR REGISTER

BACKGROUND OF THE INVENTION

1. Field of the Invention

The present invention relates to a synchronization and communication control system among processors in a computer system configured in the form of a multiprocessor

2. Description of the Prior Art

Vector processors have been developed for the purpose of processing scientific calculus at a high speed. Although even a single vector processor can exhibit high performance, there has also been developed a vector processor system configured in the form of multiprocessor, in which a plurality of vector processors are interconnected and operated in parallel (hereinafter referred to as a multivector processor), with a view of further providing improved performance.

One of conventional multivector processors is disclosed in Japanese Patent Laid-Open No. 60-37064 (1985).

Multivector processors have the following application forms:

(1) One program is executed by a plurality of processors. Thus, one program is divided into a plurality of tasks and these tasks are separately processed by the plurality of processors in parallel for improving the performance;

(2) A plurality of processors respectively process separate programs in parallel Thus, a plurality of programs are processed concurrently; and (3) Combination of (1) and (2).

When the multivector processor is used in any of the application forms, synchronization and communication means among the processors is required to have the following functions:

(1) High-speed communication, i.e., high-speed data transfer, can be performed among the processors;

(2) Tasks separately executed by the respective processors can be synchronized at a high speed; and (3) No illegal interference occurs between the processors respectively processing different programs.

Of all the above, (1) and (2) are functions important in case of processing one program by a plurality of processors, while (3) is a function important in case of processing a plurality of programs by separate processors concurrently.

SUMMARY OF THE INVENTION

It is an object of the present invention to provide a vector processor configured in the form of a multiprocessor, which can perform high-speed synchronization and high-speed data transfer among a plurality of processors when one program is processed by the plurality of processors, and which can avoid illegal interference between the processors when a plurality of programs are processed by separate processors.

To achieve the above object, the present invention resides in a vector computer system configured in the form of multiprocessor featured by at least one common vector register accessible from at least two processors, said common vector register comprising means for identifying the processor which is allowed to access the vector register, means for holding the values of vector data consisting of a plurality of elements, and means for indicating the access status corresponding to the respective vector elements; means for writing into the said identifying means which processor is allowed to access to the vector register; and means for writing the vector data values into the said holding means. To put it more specifically, the multiprocessor system of the present invention includes at least one common vector register accessible from all of the vector processors constituting the multiprocessor, in order to transfer vector data among the vector processors at a high speed. The common vector register includes data fields each holding the value of the vector data, access control fields provided in correspondence with the respective data fields and used for synchronization of data sending and receiving when the vector data is transferred among the different vector processors through the common vector register, and an access right field used for managing the number of the vector processor which is allowed to access the common vector register. The common vector register having such three types of fields is operated using the following three instructions:

(1) An instruction for transferring data between the common vector register and a vector register in each vector processor;

(2) An instruction for transferring data between the common vector register and a main storage; and (3) An instruction for changing the content of the access right field of the common vector register, and an instruction for reading the content thereof.

Here, the instructions (1) and (2) have additional functions of specifying the value of the access control field corresponding to each data field, which should be taken at the time of access to the relevant data field of the common vector register, and of specifying the content of the access control field corresponding to each data field, which should be changed following access to the relevant data field. At execution of the instructions (1) and (2), access is made to the access right field of the common vector register to be accessed. If the access is requested from the processor which is not allowed to make the access, the access request is rejected. The instruction (3) is preferably a privileged instruction which can be used by only the system program.

With the above features, the present invention is uniquely operated as follows. In case one program is divided into plural tasks and the respective tasks are processed by separate processors in parallel, when transferring vector data between the tasks, the vector data can be sent and received at a high speed bypassing the main storage by writing the vector data into the common vector register from the sending vector register and reading the content written in the common vector processor by the receiving vector processor. At this time, the access control fields of the common vector register can be used for transferring the vector data, while effecting synchronization of sending and receiving of the vector data highly efficiently. More specifically, when the sending vector processor writes the vector data into the common vector register, it is so commanded as to write the vector data irrespective of the value of the access control field corresponding to each data field, and to change the value of the access control field corresponding to the written data field to 1, for example, after writing, thereby specifying that store access to the common vector register has been made. When the receiving vector processor reads the vector data written in the common vector register, it is commanded to read only the vector elements whose access control fields corresponding to the respective data fields have the value of 1, and to change the value of the access control field to 0, for example, after reading, thereby fetching the content of the common vector register. By so doing, the vector data can be transferred among the vector processors in units of vector elements, and writing of the vector data into the common vector register from the sending vector processor can be processed in parallel to reading of that vector data from the common vector register by the receiving vector processor. In other words, an instruction of writing data into the common vector register from the sending vector processor and an instruction of reading the content of the common vector register from the receiving processor can be started simultaneously. Thus, whenever one element of the vector data is written, the value of the access control field corresponding to the data field, into which the element has been written, is changed to 1, while the instruction of reading the vector data fetches the value of the data field corresponding to that access control field which has been changed in its value to 1. Therefore, the vector data can be transferred at a high speed without changing the due order of sending and receiving the vector data. Further, when the receiving vector processor makes access to the vector data written from the sending vector processor two or more times, this can be implemented by changing the value of the access control field to 0 after reading at the final fetch access to the common vector register, and by retaining the value of the access control field following accesses in the instructions prior to the final fetch access.

Moreover, in case that some of the plural vector processors are used for processing one program and a common vector register is used among those vector processors for synchronization and communication, while other vector processors are used for processing another program and a common vector register is used among those vector processors for synchronization and communication, it is possible to avoid mutual illegal interference due to misuse of the same common vector register between the different programs, by discriminating the common vector register used for the former program from that used for the latter program, and by setting the access right fields of the respective common vector registers such that the common vector register used for the former program can be accessed by the processor processing the former program, and the common vector register used for the latter program can be accessed by the processor processing the latter program. Here, it is preferable that setting of the value into the access right field can be made by only the system program such as an operating system in view of the integrity of the system.

The foregoing and other objects, advantages, manner of operation and novel features of the present invention will be understood from the following detailed description when read in connection with the accompanying drawings.

BRIEF DESCRIPTION OF THE DRAWINGS

FIG. 3 is a view for explaining the logical configuration of the common vector registers according to the embodiment of the present invention;

FIG. 4 is a view for explaining the format of instructions for operating the common vector registers according to the embodiment of the present invention;

FIG. 5 is a view for additionally explaining functions of the instruction for operating the common vector registers shown in FIG. 4;

DETAILED DESCRIPTION OF THE PREFERRED EMBODIMENTS

One embodiment of the present invention will be described below in detail.

Figure 2:
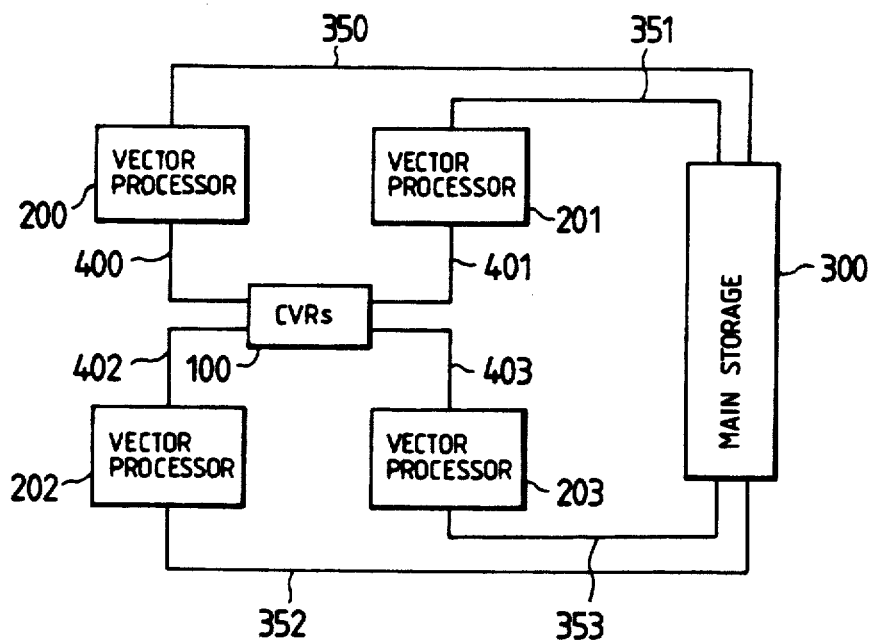
FIG. 2 is a view showing the overall configuration of a vector processor system constituted in the form of multiprocessor according to the embodiment of the present invention.

FIG. 2 is a view for explaining the overall configuration of a multivector processor according to one embodiment of the present invention. In FIG. 2, the reference numeral 100 designates common vector registers which constitute a main feature of the present invention and will be described later in more detail. Designated at 200 through 203 are vector processors. Although a multiprocessor of this embodiment comprises four vector processors, the number four was selected here just for convenience of the description and any desired number of vector processors may be employed. The internal structure of each of the vector processors 200 through 203 is disclosed in Japanese Patent Laid-Open No 61-52512 (1986), for example, and includes vector registers and pipe-lined arithmetic units. Designated at 300 is a main storage. Designated at 350 through 353 are signal lines for connecting the respective vector processors and the main storage, the signals being divided into control signals and data signals. The respective vector processors are interconnected via the main storage. Designated at 400 through 403 are signal lines for connecting the respective vector processors and the common vector registers, these signals also being divided into control signals and data signals. The respective vector processors are interconnected via the common vector registers. The vector processors 200-203 in FIG. 2 have their own instruction control sections (not shown) and can operate independently of one another.

FIG. 3 shows one embodiment of the logical configuration of the common vector registers 100 in FIG. 2. The common vector registers of this embodiment comprise 16 units of individual common vector registers which are numbered from No. 0 to No. 15 (hereinafter abbreviated to as CVR0, CVR1, ..., CVR14, CVR15, respectively). Here, the number 16 was selected for convenience of the description and any desired number of common vector registers may generally be employed. Each common vector register consists of the following three types of fields:

(1) Data field (referred to as D field)

This is a field for holding values of vector data. In this embodiment, a single common vector register can hold vector data which consists of 256 elements at maximum. One vector element has a data width of 64 bits. The number of vector elements which can be held in a single common vector register is herein referred to as the length of the common vector register. In the case of this embodiment, the length of a common vector register is equal to 256. In each common vector register, there are D fields in number equal to its own length, which are numbered in sequence. Thus, the individual D fields in this embodiment are numbered 0, 1, ..., 255.

(2) Access control field (referred to as AC field)

In each common vector register, there are AC fields in number equal to its own length, which are numbered in sequence. Thus, the individual AC fields in this embodiment are numbered 0, 1, ..., 255. In each common vector register, the D field and the AC field both having the same number are in a corresponding relationship.

The AC fields have each a width of 1 bit and can assume either one of a set and reset status.

(3) Access right field (R field)

There is a single R field in each common vector register. The R field may have a data width selected to be equal to or more than the number of vector processors constituting the multivector processor. In case of this embodiment, the data width is 4 bits. The individual bits are numbered 0, 1, 2, 3 to indicate their bit positions, such that the respective bits are in one-to-one correspondence to the numbers of individual vector processors which jointly constitute the multivector processor. More specifically, when the bit 0 of the R field takes a value of 1, access to the relevant common vector register from the vector processor No. 0 is permitted. But when the bit 0 takes a value of 0, access to the relevant common vector register from the vector processor No. 0 is rejected. The bit 0 of the R field has no part in access availability of the relevant common vector register from the vector processors other than the No. 0 processor. Further, if both bits 0 and 1 of the R field take a value of 1, for example, the relevant common vector register is available to be accessed from any of the vector processors Nos. 0 and 1. In case of dividing one program into two tasks, processing the respective tasks by the vector processor No. 0 and the vector processor No. 1 in parallel, and communicating vector data between the separate tasks using the common vector registers Nos. 0 and 1 (CVR0, CVR1), for example, it is just required to set the bits 0 and 1 of the R field in each of CVR0 and CVR1 equal to 1, but set the bits 2 and 3 thereof equal to 0 prior to start of execution of the program.

One embodiment of a set of instructions for operating the common vector registers will now be described. These instructions are to be executed by the respective vector processors which jointly constitute the multivector processor.

To begin with, an embodiment of the format of instructions for operating the common vector registers will be described with reference to FIG. 4. In this embodiment, the instruction has a length of 4 bytes (=32 bits) and consists of 5 fields. Specifically, 16 bits ranging from bit 0 to 15 of the instruction represent an OP field, 4 bits ranging from bit 16 to 19 an R1 field, 4 bits ranging from bit 20 to 23 an R2 field, 4 bits ranging from bit 24 to 27 an AC0 field, and 4 bits ranging from bit 28 to 31 an AC1 field.

The OP field specifies an instruction code. The R1 and R2 fields each specify the number of a common vector register or the number of the vector register in each vector processor, as appropriate.

The AC0 field specifies the condition of the access control field in the common vector register at the time when access is made to that common vector register.

The AC1 field specifies the value of the access control field in the common vector register, which should be set after the completion of the access to that common vector register.

The values to be specified by the AC0 and AC1 fields and their meanings are shown in FIG. 5.

Next, instructions for operating the common vector registers will be described more specifically.

(1) RCVR Instruction

Read CVR

This is an instruction for reading the content of the common vector register specified by the R2 field and writing it into the vector register specified by the R1 field. The vector register specified by the R1 field is a vector register within the vector processor which issues this instruction. Thus, the R1 field of the instruction specifies the number of the vector register within the vector processor which issues this instruction. The R2 field of the instruction specifies the number of the common vector register. The AC0 field of the instruction specifies the condition of the access control field necessary for read access to the common vector register. The values to be specified by the AC0 field and their meanings are as shown in FIG. 5. The AC1 field specifies the value of the access control field to be set after the completion of the read access to the common vector register. The values to be specified by the AC1 field and their meanings are as shown in FIG. 5.

In processing of this instruction, a check of the condition of the access control field specified by the AC0 field, read access to the data field in the common vector register, and a setting of the value of the access control field specified by the AC1 field are carried out sequentially for each of the vector elements in the common vector register. For example, in processing of the 10-th vector element, if the value of the access control field corresponding to the 10-th vector is not consistent with the condition specified by the AC0 field, the system waits until consistency is reached. Upon reaching the consistency, the value of the data field corresponding to the 10-th vector element is read and written into the vector register specified by the R1 field. At the same time, the value of the access control field corresponding to the 10-th vector element is changed in accordance with the content specified by the AC1 field. Then, the system advances to the processing of the 11-th vector element.

(2) WCVR Instruction

Write CVR

This is an instruction for reading the content of the vector register specified by the R2 field and writing it into the common vector register specified by the R1 field. The vector register specified by the R2 field is a vector register within the vector processor which issues this instruction. Thus, the R2 field of the instruction specifies the number of the vector register within the vector processor which issues this instruction. The R1 field of the instruction specifies the number of the common vector register. The AC0 field of the instruction specifies the condition of the access control field necessary for write access to the common vector register. The values to be specified by the AC0 field and their meanings are as shown in FIG. 5. The AC1 field specifies the value of the access control field to be set after the completion of the write access to the common vector register. The values to be specified by the AC1 field and their meanings are per shown in FIG. 5.

In processing of this instruction, a check of the condition of the access control field specified by the AC0 field, write access to the data field in the common vector register, and a setting of the value of the access control field specified by the AC1 field are carried out sequentially for each of the vector elements in the common vector register in a like manner to the above RCVR instruction.

(3) LCVR Instruction

Load CVR

This is an instruction for loading data from the main storage into the common vector register specified by the R1 field. The R1 field of the instruction specifies the number of the common vector register. The R2 field of the instruction specifies the number of a general-purpose register which indicates location of the data in the main storage. The general-purpose register specified is a general-purpose register within the vector processor which issues this instruction. The AC0 field of the instruction specifies the condition of the access control field necessary for loading data into the common vector register. The values to be specified by the AC0 field and their meanings are as shown in FIG. 5. The AC1 field specifies the value of the access control field to be set after the completion of the load access to the common vector register. The values to be specified by the AC1 field and their meanings are as shown in FIG. 5.

In processing of this instruction, a check of the condition of the access control field specified by the AC0 field, load access to the data field in the common vector register, and a setting of the value of the access control field specified by the AC1 field are carried out sequentially for each of the vector elements in the common vector register in a like manner to the above WCVR instruction.

When the R2 field specifies 0, no data is loaded into the common vector register, the content specified by the AC0 field is ignored, and only the value of the access control field in the common vector register specified by the R1 field is changed in accordance with the content specified by the AC1 field. In other words, when only the access control field is desired to be changed in some common vector register, it is only required to specify an R2 field equal to 0 in this instruction.

(4) STCVR Instruction

Store CVR

This is an instruction for storing the content of the common vector register specified by the R1 field into the main storage. The R1 field of the instruction specifies the number of the common vector register. The R2 field of the instruction specifies the number of a general-purpose register in which the address of the main storage storing the data therein is held. The general-purpose register specified is a general-purpose register within the vector processor which issues this instruction. The AC0 field of the instruction specifies the condition of the access control field necessary for storing data into the common vector register. The values to be specified by the AC0 field and their meanings are as shown in FIG. 5. The AC1 field specifies the value of the access control field to be set after the completion of the store access to the common vector register. The values to be specified by the AC1 field and their meanings are as shown in FIG. 5.

In processing of this instruction, a check of the condition of the access control field specified by the AC0 field, a storing of the data field of the common vector register into the main storage, and a setting of the value of the access control field specified by the AC1 field are carried out sequentially for each of the vector elements in the common vector register in a like manner to the above RCVR instruction.

When the R2 field specifies 0, no data in the common vector register is stored, the content specified by the AC0 field is ignored, and only the value of the access control field in the common vector register specified by the R1 field is changed in accordance with the content specified by the AC1 field. In other words, when only the access control field is desired to be changed in some common vector register, it is only required to specify an R2 field equal to 0 in this instruction.

In addition to the above, there are also the following instructions for operating on the access right fields of the common vector registers. These instructions are all privileged instructions that are available to the operating system only.

(1) SRCVR Instruction

Set R field of CVR

This is an instruction for setting data in the main storage into the access right field of the common vector register specified by the R1 field. The address of the main storage for the data to be set is held by the general-purpose register specified by the R2 field. The R1 field of the instruction specifies the number of the common vector register. The R2 field of the instruction specifies the number of the general-purpose register. The AC0 and AC1 fields of the instruction are not used.

(2) STRCVR Instruction

Store R field by CVR

This is an instruction for storing the content of the access right field of the common vector register specified by the R1 field in the main storage. The address of the main storage is held by the general-purpose register specified by the R2 field. The R1 field of the instruction specifies the number of the common vector register. The R2 field of the instruction specifies the number of the general-purpose register. The AC0 and AC1 fields of the instruction are not used.

There will now be described the configuration of the common vector registers for processing the instructions to operate the common vector registers according to the foregoing embodiment of the present invention.

Figure 1:
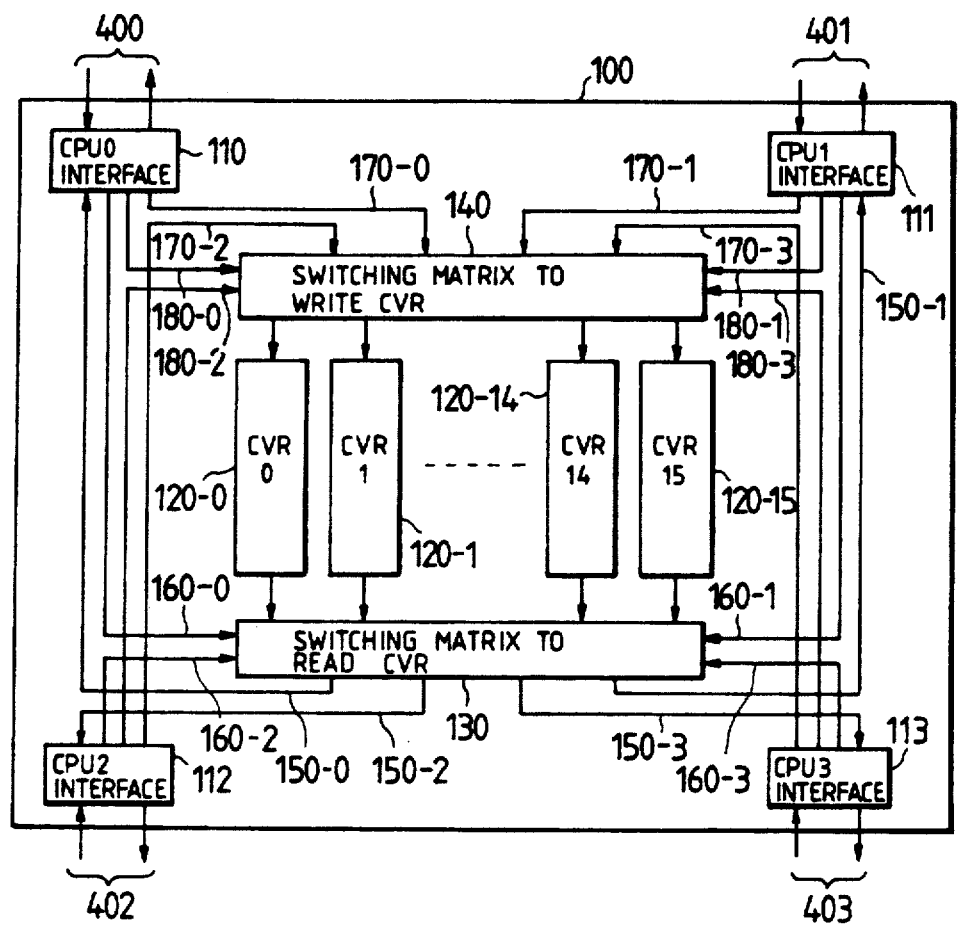
FIG. 1 is a view showing the overall configuration of common vector registers according to an embodiment of the present invention.

FIG. 1 shows the CVRs 100 in FIG. 2 in detail. Designated at 110, 111, 112, 113 are interface units between the CVRs and the respective vector processors (CPUs), each having the same internal configuration. The CPU interface unit 110 is connected to the CPU 200 in FIG. 2 through the group of signal lines 400. Likewise, the CPU interface units 111, 112, 113 are connected to the CPUs 201, 202, 203 in FIG. 2 through the groups of signal lines 401, 402, 403, respectively. In FIG. 1, designated at 120-0 through 120-15 are mainframes of the respective common vector register, as will be described later in detail. Referring to FIG. 1, designated at 130 is a switching matrix to read CVR, which serves as a circuit for making the CVR correspond to the CPU interface unit at the time of reading each CVR. Groups of signal lines 150-0 through 150-3 serve to connect the switching matrix 130 with the CPU interface units 110 through 113, respectively, and are used for transferring control information about read access to the CVR and the data fetched from the CVR between the switching matrix and the respective CPU interface units. Groups of signal lines 160-0 through 160-3 serve to supply information for setting the switching matrix to read the CVR 130 from the respective CPU interface units. In FIG. 1, designated at 140 is a switching matrix to write the CVR, which serves as a circuit for making the CVR correspond to the CPU interface unit at the time of writing each CVR. Groups of signal lines 170-0 through 170-3 serve to connect the switching matrix to write the CVR 140 with the CPU interface units 110 through 113, respectively, and are used for transferring control information about write access to the CVR and the data written into the CVR between the switching matrix and the respective CPU interface units. Groups of signal lines 180-0 through 180-3 serve to supply information for setting the switching matrix to write the CVR 140 from the respective CPU interface units.

Figure 6:
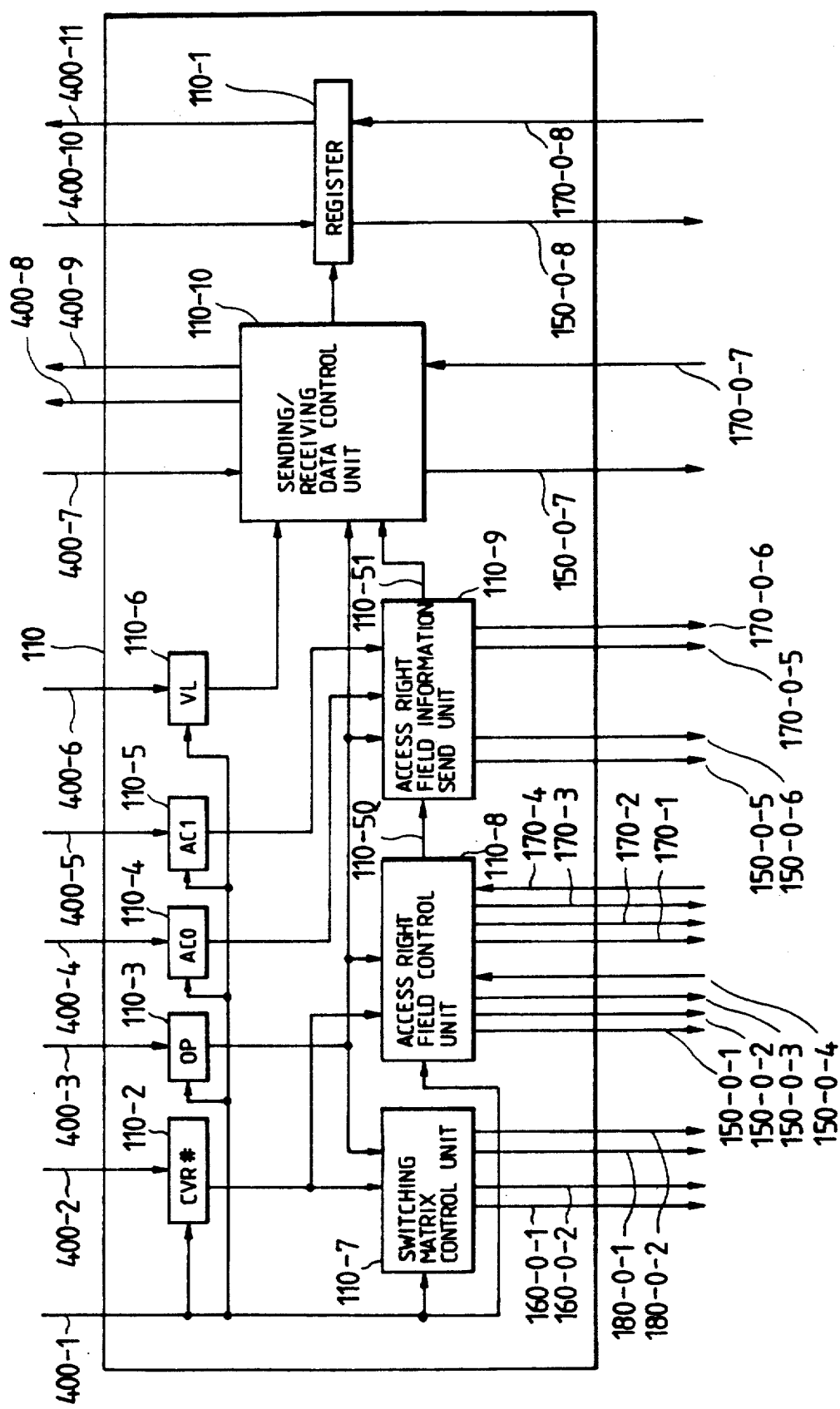
FIG. 6 is a view for explaining an interface units between the respective vector processors and the common vector registers according to the embodiment of the present invention.

The CPU interface units 110 through 113 in FIG. 1 will be described below in more detail with reference to FIG. 6. Note that although FIG. 6 shows the configuration of only the CPU interface unit 110 in FIG. 1, the other CPU interface units 111, 112, 113 in FIG. 1 also have the same configuration. The CPU interface unit 110 is connected to the CPU0 through the group of signal lines 400. Details of information transmitted through the group of signal lines 400 will be described by referring to FIG. 6. A signal to change the access to CVR is transmitted from the CPU0 through a signal line 400-1. The number of the CVR to be accessed is sent through a signal line 400-2, the type of the access to the CVR, such as read (fetch) or write (store) access, is sent through a signal line 400-3, the value of the access control field prior to access (i.e., the value specified by the AC0 field of the instruction) is sent through a signal line 400-4, and the value of the access control field to be set following the access to the CVR (i.e., the value specified by the AC1 field of the instruction) is sent through a signal line 400-5, respectively. The number of vector elements (vector length) to be processed is sent through a signal line 400-6. Signal lines 400-7, 400-8, 400-9 are control signal lines necessary for transfer of data written into or read from a CVR between the CPU0 and the CVR. The signal line 400-7 transmits a data delivery command signal from the CPU0, and together with this signal, the data is sent through a signal line 400-10 and set into a register 110-1. The signal line 400-8 transmits a data delivery command signal used for sending the data fetched from the CVR to the CPU0, and together with this signal, the data is sent to the CPU0 through a signal line 400-11. The signal line 400-9 transmits a signal which turns on when the final data relating to one instruction for the access to the CVR is delivered through the signal line 400-11. In FIG. 6, the groups of signal lines 150-0, 160-0 are connected to the respective CVRs through the switching matrix 130. The groups of signal lines 160-0, 180-0 are connected to the respective CVRs through the switching matrix CVR 140. Here, the groups of signal lines 150-0 and 170-0, 160-0 and 180-0 transfer the same content of information, with the only difference being that the former ones 150-0, 160-0 are connected to the switching matrix 130, while the latter ones 170-0, 180-0 are connected to the switching matrix 140. Details of the transferred content of information will now be described with reference to FIG. 6. A signal line 160-0-1 transmits a signal to change the connection of the switching matrix 130, and together with this signal, the number of the CVR to be accessed is delivered through a signal line 160-0-2. Using those signals, the switching matrix 130 shown in FIG. 1 makes the CPU0 interface unit 110 correspond to the CVR to be accessed. Likewise, a signal line 180-0-1 transmits a signal to change the connection of the switching matrix 140, and together with this signal, the number of the CVR to be accessed is delivered through a signal line 180-0-2. Using those signals, the switching matrix 140 shown in FIG. 1 makes the CPU0 interface unit 110 correspond to the CVR to be accessed. Signal lines 150-0-1 through 150-0-4 and signal lines 170-0-1 through 170-0-4 serve to transfer information about handling of the access right field of the CVR to be accessed. When the CVR is ready to accept a fetch access, the access right field of the CVR to be accessed is checked through the switching matrix 130 using the set of signal lines 150-0. When the CVR is ready to accept a store access, the access right field of the CVR to be accessed is checked through the switching matrix 140 using the set of signal lines 170-0. The switching matrix 130 or the switching matrix 140 makes the CPU0 interface unit correspond to the CVR to be accessed using the sets of signal lines 160-0 or 180-0, respectively, so that the access right field of the CVR to be accessed is checked therethrough. More specifically, the signal line 150-0-1 or 170-0-1 transmits a signal indicating the content of processing of the access right field. The signal line 150-0-2 or 170-0-2 serves to notify the number of the CPU to be accessed when the CVR is ready to accept a fetch or store access, respectively. The signal line 150-0-3 or 170-0-3 serves to send the value of the access right field to be set, in case of a processing to change the content of the access right field (SRCVR instruction). The signal line 150-0-4 or 170-0-4 serves to receive the value of the access right field, in case of a processing to read the content of the access right field (STRCVR instruction). Signal lines 150-0-5 through 150-0-6 or signal lines 170-0-5 through 170-0-6 serve to send the condition of the access control field necessary for access, when the CVR is ready to accept a fetch or store access, respectively. More specifically, the signal line 150-0-5 or 170-0-5 delivers the condition of the access control field prior to access (i.e., the value specified by the AC0 field of the instruction), and the signal line 150-0-6 or 170-0-6 delivers the condition of the access control field following access (i.e., the value specified by the AC1 field of the instruction). Signal lines 170-0-7 through 170-0-8 are used for delivering the data to be stored, when the CVR is ready to accept a store access. More specifically, the signal line 170-0-7 transmits a data delivery command signal, and together with this signal, the data to be stored is delivered to the CVR through the signal line 170-0-8. That data is stored into the CVR to be accessed through the switching matrix 140, which has already been set. Signal lines 150-0-7 through 150-0-8 are used for receiving the data to be fetched, when the CVR is ready to accept a fetch access. More specifically, the signal line 150-0-7 transmits a data delivery command signal from the CVR side, and together with this signal, the data fetched from the CVR is sent to the CPU interface unit through the signal line 150-0-8. That data is fetched from the CVR to be accessed through the switching matrix 130 to fetch the CVR, which has already been set. There will now be explained how the CPU interface unit is made up. In FIG. 6, designated at 110-2, 110-3, 110-4, 110-5, 110-6 are registers which serve to hold information sent from the CPU. These registers are reset by the signal to change the access to the CVR sent from the CPU through the line 400-1. The register 110-2 holds the number of the CVR to be accessed which is sent through the signal line 400-2. The register 110-3 holds the type of the content processing required (i.e., operating code of the instruction) which is sent through the signal line 400-3. The register 110-4 holds the condition of the access control field prior to access (i.e., the AC0 field of the instruction) which is sent through the signal line 400-4. The register 110-5 holds the condition of the access control field following access (i.e., the AC1 field of the instruction) which is sent through the signal line 400-5. The register 100-6 holds the number of vector elements (i.e., vector length) which is sent through the signal line 400-6. In FIG. 6, designated at 110-7 is a switching matrix control unit which is activated by the signal to change the access to the CVR sent from the CPU0 through the line 400-1, for producing and delivering a signal to set the switching matrix based on both the number of the CVR to be accessed that is held in the register 110-2 and the type of the content processing required that is held in the register 110-3. When the content to be processed requires a fetch access, the signal to change the connection of the switching matrix 130 is delivered through the signal line 160-0-1 and the number of the CVR to be accessed is delivered through the signal line 160-0-2, respectively. When the content of processing requires a store access, the signal to change the connection of the switching matrix 140 is delivered through the signal line 180-0-1 and the number of the CVR to be accessed is delivered through the signal line 180-0-2, respectively. In FIG. 6, designated at 110-8 is an access right field control unit which is activated by the signal to change the access to the CVR sent from the CPU0 through the line 400-1, for receiving both the number of the CVR to be accessed that is held in the register 110-2 and the type of the content to be processed that is held in the register 110-3. When the content of processing requires a fetch access to the CVR, a "consistency check" is delivered as the content of processing the access right field through the signal line 150-0-1, and at the same time, the number of the CPU which fetches the content of the CVR is sent through the signal line 150-0-2. This information is sent to the CVR to be accessed through the switching matrix 130, and the result of the consistency check is returned through the signal line 150-0-4. When the content of processing requires a store access to the CVR, a "consistency check" is delivered as the content of processing the access right field through the signal line 170-0-1, and at the same time, the number of the CPU which stores the content of the CVR is sent through the signal line 170-0-2. This information is sent to the CVR to be accessed through the switching matrix 140, and the result of the consistency check is returned through the signal line 170-0-4. If there arrives a return signal indicating the consistency as a result of the consistency check through the signal line 150-0-4 or 170-0-4, this means that the fetch or store access to the CVR is allowed, and such information is returned through a signal line 110-50. When the content of processing requires change in the access right field, a "change of the access right field" is instructed as the content of processing the access right field through the signal line 150-0-1, and the value of the access right field to be changed is sent through the signal line 150-0-3. The above processing can also be performed using the signal lines 170-0-1 and 170-0-3. When the content of processing requires fetching of the access right field, a "fetch of the access right field" is instructed as the content of processing the access right field through the signal line 150-0-1, and the value of the access right field having been fetched is sent through the signal line 150-0-4. The above processing can also be performed using the signal lines 170-0-1 and 170-0-4. In FIG. 6, designated at 110-9 is an access control field information send unit which is actuated by the signal to allow reading/writing sent from the access right field control unit 110-8 through the signal line 110-50. Applied to the access control field information send unit 110-9 are the type of the content of processing required that is held in the register 110-3, the content of the AC0 field of the instruction that is held in the register 110-4, and the content of the AC1 field of the instruction that is held in the register 110-5. When the content of processing requires a fetch access to the CVR, the content of the AC0 field of the instruction is delivered through the signal line 150-0-5, and the content of the AC1 field of the instruction is delivered through the signal line 150-0-6, respectively. When the content of processing requires a store access to the CVR, the content of the AC0 field of the instruction is delivered through the signal line 170-0-5, and the content of the AC1 field of the instruction is delivered through the signal line 170-0-6, respectively. After the completion of delivery of the contents of the AC0 and AC1 fields, information indicating the completion of delivery is notified through a signal line 110-51. In FIG. 6, designated at 110-10 is a sending/receiving data control unit which serves to control transfer of the data fetched from the CVR or the data stored into the CVR between the CVR and the CPU. The sending/receiving data control unit 110-10 is activated by a signal indicating the completion of delivery of the access control field information sent from the access control field information send unit 110-9 through the signal line 110-51. Applied to the sending/receiving data control unit 110-10 are the type of the content of processing required that is held in the register 110-3 and the number of vector elements to be processed that is held in the register 110-6. When the content of processing requires a store access to the CVR, the sending-/receiving data control unit 110-10 receives the data delivery command signal sent from the CPU0 through the signal line 400-7 and, at the same time, sets the data sent through the signal line 400-10 into the register 110-1. Subsequently, it sends the data delivery command signal to the CVR through the switching matrix 140 using the signal line 170-0-7 and, at the same time, delivers the data through the signal line 170-0-8. When the content of processing requires a fetch access to the CVR, the sending/receiving data control unit 110-10 receives the data delivery command signal sent from the CVR via the switching matrix 130 through the signal line 150-0-7 and, at the same time, sets the data sent through the signal line 150-0-8 into the register 110-1. Subsequently, it sends the data delivery command signal to the CPU0 through the signal line 400-8 and, at the same time, delivers the data through the signal line 400-11. Whenever one data is delivered, the value of vector elements to be processed is incremented by one. Upon that value reaching 0, it is understood that processing of all the vector elements has have been completed. Therefore, a data delivery end signal is sent through the signal line 400-9.

Next, the internal configuration of the CVR0 through CVR15 shown in FIG. 1 (respectively designated at 120-0 through 120-15 in the figure) will be described with reference to FIG. 7. CVR0 through CVR15 each have the same internal configuration, and hence FIG. 7 shows the internal configuration of CVR0 alone.

Figure 7:
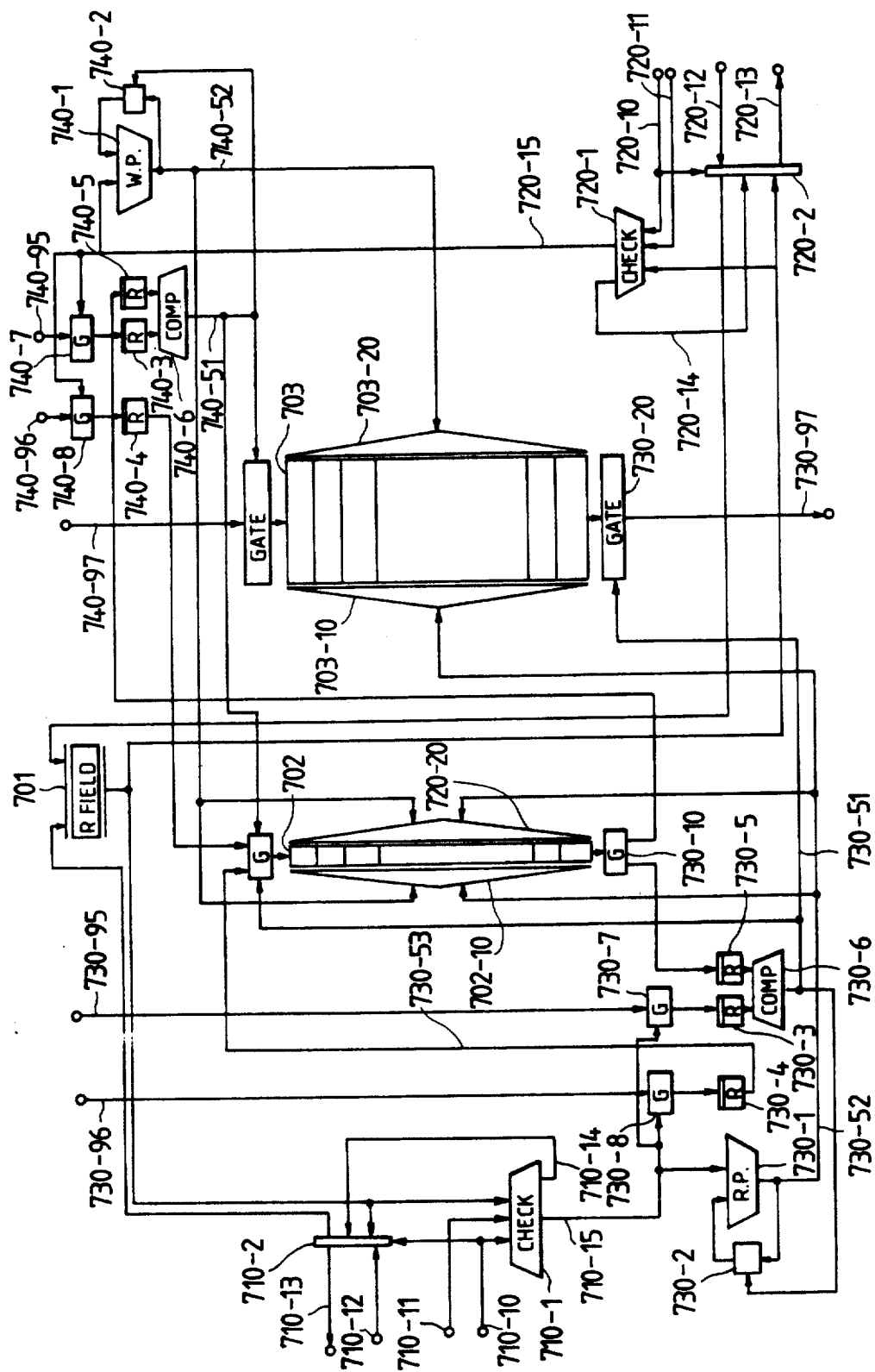
FIG. 7 is a view for explaining the internal configuration of the common vector registers according to the present invention.

In FIG. 7, designated at 701 is the R field (access right field) of CVR0, at 702 is the AC field (access control field) thereof, and at 703 is the D field (data field) thereof. In this embodiment, since a single common vector register can hold 256 vector elements at maximum, there exit 256 D fields corresponding to the respective vector elements and 256 AC fields corresponding to the respective D fields.

In FIG. 7, designated at 710-1 is a consistency check circuit and at 710-2 is a selector, both of which are related to control of the R field. Signal lines 710-10 and 710-11 serve to send a signal to command the content of processing the R field, and the number of the CPU making access to the CVR. For example, if the number of the CPU making access to the CVR0 is equal to zero, the signal lines 710-10 and 710-11 are those which should be connected to the signal lines 150-0-1 and 150-0-2 shown in FIG. 6 through the switching matrix 130, respectively. Where the content of a command sent through the signal line 710-10 is "consistency check", the number of the CPU sent through the signal line 710-11 is compared with the content of the R field taken from the register 701 in the consistency check circuit 710-1, and the compared result is issued to a signal line 710-14. Also, when the compared result shows consistency, a signal line 710-15 is turned on. The compared result is returned from the signal line 710-14 to the CPU interface unit through a signal line 710-13 via the selector 710-2. For example, if the number of the CPU making access to the CVR0 is equal to zero, the signal line 710-13 is that one which should be connected to the signal line 150-0-4 shown in FIG. 6 through the switching matrix 130. Where the content of command sent through the signal line 710-10 is "change of the R field", the value to be changed is sent through a signal line 710-12 and then written into the register 701 through the selector 710-2. For example, if the number of the CPU making access to the CVR0 is equal to zero, the signal line 710-12 is that one which should be connected to the signal line 150-0-3 shown in FIG. 6 through the switching matrix 130. Where the content of the command sent through the signal line 710-10 is "fetch access to the R field", the content of the R field fetched from the register 701 is sent to the CPU interface unit through the switching matrix 130 from the signal line 710-13 via the selector 710-2.

In FIG. 7, components designated at 720-1, 720-2, 720-10, 720-11, 720-12, 720-13, 720-14, 720-15 are functionally identical to those designated at 710-1, 710-2, 710-10, 710-11, 710-12, 710-13, 710-14, 710-15, respectively The difference therebetween is just in that the former are connected to the CPU interface unit through the switching matrix 140.

In FIG. 7, components designated at 730-1, 730-2, 730-3, 730-4, 730-5, 730-6, 730-7, 730-8, 730-10, 730-20 are related to control of reading the data from the CVR and sending it to the CPU interface unit. In FIG. 7, designated at 730-1 is a read pointer which is a circuit for specifying locations of the D field and the AC field from which the next data is to be fetched. Designated at 730-2 is an updating circuit for the read pointer, which updates the read pointer upon the completion of processing of each vector element, for setting locations of the D field and the AC field from which the next data is to be fetched. Designated at 730-3, 730-4, 730-5 are registers. The register 730-3 serves to hold the condition of the access control field prior to access to the CVR (i.e., value specified by the AC0 field of the instruction) that is read from the CPU interface unit and sent via the switching matrix 130. The register 730-4 serves to hold the condition of the access control field following access to the CVR (i.e., the value specified by the AC1 field of the instruction) that is read from the CPU interface unit and sent via the switching matrix to read CVR 130. The register 730-5 serves to hold the value fetched from the AC field. Designated at 730-6 is a comparator which compares the content of the register 730-3 with that of the register 730-5 and then issues the compared result onto a signal line 730-51. Designated at 730-7 and 730-8 are gates serving to set the condition of the access control field prior to the access to CVR (i.e., the value specified by the AC0 field of the instruction) and the condition of the access control field following access to the CVR (i.e., the value specified by the AC1 field of the instruction), that are sent from the CPU interface unit via the switching matrix 130 through the signal lines 730-95 and 730-96, into the registers 730-3 and 730-4, respectively. These gates are operated upon the signal line 710-15 turning on, to thereby set the contents of the signal lines 730-95 and 730-96 in the registers 730-3 and 730-4, respectively. Thus, such setting is made at the time when the access to the CVR is allowed as a result of checking the access right field during an access step to the CVR. For example, in case of processing where CPU0 makes a fetch access to the CVR0, the signal lines 730-95 and 730-96 are those ones which should be connected to the signal lines 150-0-5 and 150-0-6 through the switching matrix 130. Details of processing to read the CVR will now be described. In the process of reading the CVR, when the access to the CVR is allowed as a result of checking the access right field, the signal line 710-15 is turned on and the read pointer 730-1 is initialized to point to the first vector element. Simultaneously, the contents of the AC0 and AC1 fields both specified by the instruction are set in the registers 730-3 and 730-4, respectively. To begin with, the value of the read pointer 730-1 is transmitted to an AC field read control unit 702-10 through a signal line 730-52. The AC field read control unit 702-10 fetches the content of the AC field in a position specified and then sets the fetched value in the register 730-5 via a read gate 730-10. Thereafter, the comparator 730-6 compares the value of the register 730-3 with that of the register 730-5, and the compared result is issued onto the signal line 730-51. If the compared result shows consistency of both the values, this means that the condition of the access control field necessary for reading the CVR has been satisfied, and the system steps into the operation of reading the D field. More specifically, in the state that the value of the read pointer is being applied to a D field read control unit 703-10, when the signal to indicate meeting of the condition of the access control field is indicated through the signal line 730-51, a D field read gate 730-20 is opened so that the fetched content of the D field is sent to the CPU interface unit through a signal line 730-96 via the switching matrix 130. For example, in case of processing where the CPU0 makes a fetch access to the CVR0, the signal line 730-96 is that one which should be connected to the signal line 150-0-8 through the switching matrix 130. In parallel to reading from the D field, the AC field is updated. More specifically, when the signal to indicate meeting of the condition of the access control field is indicated through the signal line 730-51, an AC field write gate 740-10 is opened and the location of the AC field to be updated is sent to an AC field write control unit 702-20 through the signal line 730-52, so that the content of the register 730-4 is written into the predetermined location of the AC field through the AC field write gate 740-10 for updating the value of the AC field. Finally, upon receipt of the signal to indicate meeting of the condition of the access control field through the signal line 730-51, the read pointer updating circuit 730-2 is operated to update the read pointer 730-1 such that it now points locations of the AC field and the D field to be processed in the next step.

In FIG. 7, components designated at 740-1, 740-2, 740-3, 740-4, 740-5, 740-6, 740-7, 740-8, 740-10, 740-20 are related to control of writing the data into the CVR from the CPU interface unit through the switching matrix 140. In FIG. 7, designated at 740-1 is a write pointer which is a circuit for specifying locations of the D field and the AC field into which the next data is to be stored. Designated at 740-2 is an updating circuit for the write pointer, which updates the write pointer upon the completion of processing of each vector element, for setting locations of the D field and the AC field into which the next data is to be stored. Designated at 740-3, 740-4, 740-5 are registers. The register 740-3 serves to hold the condition of the access control field prior to access to the CVR (i.e., value specified by the AC0 field of the instruction) that is sent from the CPU interface unit via the switching matrix 140. The register 740-4 serves to hold the condition of the access control field following access to the CVR (i.e., the value specified by the AC1 field of the instruction) that is sent from the CPU interface unit via the switching matrix 140. The register 740-5 serves to hold the value fetched from the AC field. Designated at 740-6 is a comparator which compares the content of the register 740-3 with that of the register 740-5 and then issues the compared result onto a signal line 740-51. Designated at 740-7 and 740-8 are gates serving to set the condition of the access control field prior to access to the CVR (i.e., the value specified by the AC0 field of the instruction) and the condition of the access control field following access to the CVR (i.e., the value specified by the AC1 field of the instruction), that are sent from the CPU interface unit via the switching matrix 140 through the signal lines 740-95 and 740-96, into the registers 740-3 and 740-4, respectively. These gates are operated upon the signal line 720-15 turning on, to thereby set the contents of the signal lines 740-95 and 740-96 in the registers 740-3 and 740-4, respectively. Thus, such setting is made at the time when the access to the CVR is allowed as a result of checking the access right field during an access step to the CVR. For example, in case of processing where the CPU0 makes a store access to CVR0, the signal lines 740-95 and 740-96 are those ones which should be connected to the signal lines 170-0-5 and 170-0-6 through the switching matrix 140. Details of the processing to write the CVR will now be described. In the process of writing the CVR, when the access to the CVR is allowed as a result of checking the access right field, the signal line 720-15 is turned on and the write pointer 740-1 is initialized to point to the first vector element. Simultaneously, the contents of the AC0 and AC1 fields both specified by the instruction are set in the registers 740-3 and 740-4, respectively. To begin with, the value of the write pointer 740-1 is transmitted to the AC field read control unit 702-10 through a signal line 740-52. The AC field read control unit 702-10 fetches the content of the AC field in a position specified and then sets the fetched value in the register 740-5 via a read gate 730-10. Thereafter, the comparator 740-6 compares the value of the register 740-3 with that of the register 740-5, and the compared result is issued onto the signal line 740-51. If the compared result shows consistency of both the values, this means that the condition of the access control field necessary for writing the CVR is met, and hence the system steps into the operation of writing the D field. More specifically, in the state that the value of the write pointer is being applied to a D field write control unit 703-10, when the signal to indicate meeting of the condition of the access control field is indicated through the signal line 740-51, a D field write gate 740-20 is opened. The written data is sent from the CPU interface unit to a signal line 740-97 via the switching matrix 140, and then is stored into a predetermined location through the D field write gate 740-20. For example, in case of processing where the CPU0 makes a store access to the CVR0, the signal line 740-97 is that one which should be connected to the signal line 170-0-8 through the switching matrix 140. In parallel to writing into the D field, the AC field is updated. More specifically, when the signal to indicate meeting of the condition of the access control field is indicated through the signal line 740-51, the AC field write gate 740-10 is opened and the location of the AC field to be updated is sent to the AC field write control unit 702-20 through the signal line 740-52, so that the content of the register 740-4 is written into the predetermined location of the AC field through the AC field write gate 740-10 for updating the value of the AC field. Finally, upon receipt of the signal to indicate meeting of the condition of the access control field through the signal line 740-51, the write pointer updating circuit 740-2 is operated to update the write pointer 740-1 such that it now points to locations of the AC and D fields to be processed in the next step.

Next, there will described a simple example of application to multiprogramming/multitasking for which the common vector registers according to the embodiment of the present invention are used.

Assuming now that two jobs P and Q are processed in the configuration of the multivector computer shown in FIG. 2. It is also assumed that the job P is processed by executing two tasks P0 and P1 capable of parallel processing. Likewise, it is assumed that the job Q is processed by executing two tasks Q0 and Q1 capable of parallel processing. Here, supposing that the tasks P0 and P1 of the job P are processed by CPU0 (200 in FIG. 2) and CPU1 (201 in FIG. 2), and the tasks Q0 and Q1 of the job Q are processed by CPU2 (202 in FIG. 2) and CPU3 (203 in FIG. 2), respectively. It is also supposed that the tasks P0 and P1 of the job P transfer vector data therebetween through the common vector register No. 0 (CVR0), while the tasks Q0 and Q1 of the job Q transfer vector data therebetween through the common vector register No. 15 (CVR15).

In the above case, the operating system first sets the access right fields of CVR0 and CVR15. The value set in the R field of CVR0 is equal to '1100', because CVR0 must be ready to allow access from CPU0 and CPU1 (respectively processing the tasks P0 and P1), but reject access from CPU2 and CPU3. The above value is set using the SRCVR instruction. The value set in the R field of CVR15 is equal to '0011', because CVR15 must be ready to allow access from CPU2 and CPU3 (respectively processing the tasks Q0 and Q1), but reject access from CPU0 and CPU1. The above value is set using the SRCVR instruction. With such setting, if there is any failure in the program constituting the job Q, for example, access to CVR0 is surely rejected even when such access to CVR0 is attempted, thereby preventing an adverse effect upon execution of the job P.

Figure 8:
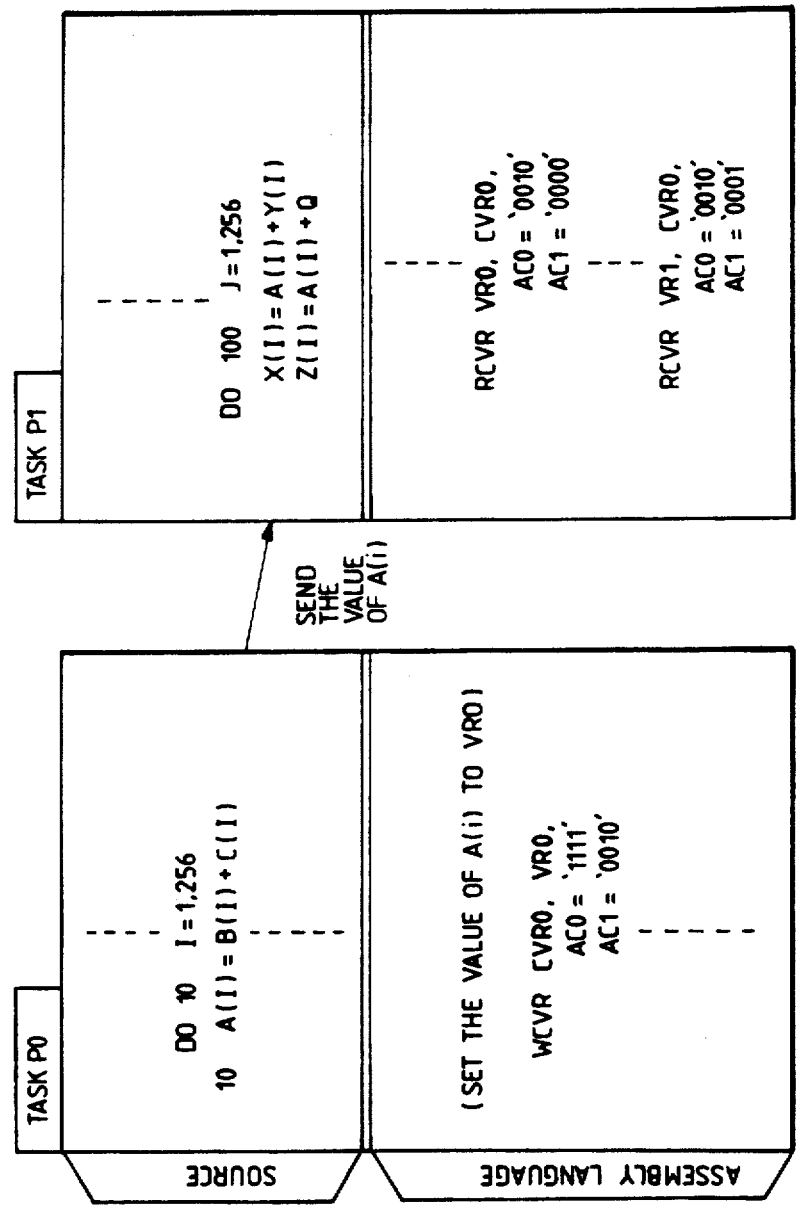
FIG. 8 is a view for explaining an example of making efficient communication between plural tasks in the embodiment of the present invention.

Assuming now that the tasks P0 and P1 of the job P communicate with each other through processing as shown in FIG. 8. More specifically, the value of an array A(i) to be used in the task P1 is calculated in the task P0 and then sent to the task P1. The array A(i) is accessed two times in the task P1. The array A is transferred through CVR0 between the tasks P0 and P1. As will be seen from coding of assembly language of FIG. 8, the task P0 sets the value of the array A obtained at the vector register No. 0 (VR0) within CPU0 into CVR0 using the WCVR instruction. At this time, the AC0 field of the WCVR instruction specifies the value of '1111' to command that the value be written into CVR0 irrespective of the value of the access control field thereof. The AC1 field of that instruction specifies the value of '0010' to command that the value of the access control field be brought into the set status after the completion of setting data to CVR0. On the other hand, the task P1 fetches the content of CVR0 using the RCVR instruction to thereby obtain the value of the array A. Although the value of the array A is accessed two times, the RCVR instruction at the first access specifies the value of '0010' by the AC0 field thereof to command that the data be fetched after the access control field of CVR0 has been brought into the set status. By so doing, after CPU0 processing the task P0 has set the value of the array A into CVR0 using the WCVR instruction, that value can be fetched quickly. The first RCVR instruction also specifies the value of '0000' by the AC1 field thereof to command that the access control field remains unchanged after the completion of fetch of the data. At the second access, the RCVR instruction specifies again the value of '0010' by the AC0 field thereof to command that the data (which has been set from CPU0) be fetched from the access control field in the set status. Since the task P1 does not need further access to the CVR0, the AC1 field of the second RCVR instruction specifies the value of '0001' for bringing the value of the access control field into the reset status. This makes it possible for the respective tasks to independently issue the WCVR instruction for setting the data into the CVR0 and the RCVR instruction for fetching the data, respectively. It is thus unnecessary to fetch the data prior to setting thereof, so that the WCVR and RCVR instructions are executed in parallel at a maximum rate to transfer vector data between the tasks at a high speed.

And in another case, when the task P0 sends the value of an array D to be used in the task P1 through CVR0, after task P1 fetches the value of said array A through CVR0, as will be seen from coding of assembly language below, the task P0 sets the value of the array D into CVR0 using the WCVR instruction.

```
task P0                    taskP1
    .
    .                      RCVR VR1, CVR0,
    .                          AC0 = '0010'
    .                          AC1 = '0001'
WCVR CVR0, VR2,                .
    AC0 = '0001'               .
    AC1 = '0001'               .
```

At this time, the AC0 field of the WCVR instruction specifies the value of '0001' to command that the value be written in the CVR0 after the access control field of CVR0 has been brought into the reset status by the RCVR instruction which fetches the value of the array A in the task P0. By so doing, after CPU1 processing the task P1 has fetched the value of the array A from CVR0, CPU0 sets the value of the array D into CVR0. It is thus unnecessary to set another data prior to fetching the data thereof.

As described above, the present invention provides a vector computer system configured in the form of multiprocessor, in which when processing a single job at an improved speed by executing plural tasks, obtained by dividing the job and capable of parallel processing, in a plurality of vector processors in parallel, vector data can be transferred between the plural vector processors at a high speed, and in which when separately processing plural jobs, consisting of one or more tasks capable of parallel processing, in a plurality of vector processors, it becomes possible to surely avoid illegal interference between the vector processors respectively processing different jobs, and hence simply prevent the event that processing of one job may adversely affect processing of another job. As a result, the vector processor system configured in the form of multiprocessor can be used efficiently in various application forms.

What is claimed is:

1. A multiprocessor system comprising:
   a plurality of vector processors;
   at least one common vector register, connected to said vector processors, for holding vector data comprised of a plurality of vector data elements;
   means for individually indicating a status of each of said vector data elements held in said common vector register, said status being indicative of accessibility of each of said vector data elements in said common vector register; and
   means for accessing said common vector register from one of said vector processors in connection with a vector data element having a status indicated by said status indicating means as being accessible; and
   control means for writing a vector data element into said common vector register irrespective of the status indicated by said indicating means, and control means for changing the status indicated by said indicating means to a status corresponding to said written vector data element, after completion of said writing.

2. A multiprocessor system comprising:

a plurality of vector processors;

at least one common vector register, connected to said vector processors, for holding vector data comprised of a plurality of vector data elements;

means for individually indicating a status of each of said vector data elements held in said common vector register, said status being indicative of accessibility of each of said vector data elements in said common vector register; and means for accessing said common vector register from one of said vector processors in connection with a vector data element having a status indicated by said status indicating means as being accessible; and control means for allowing a receiving processor to read a vector data element from said common vector register in accordance with the status of the vector data element indicated by said indicating means, and control means for changing the status indicated by said indicating means for said vector data element, after completion of reading thereof.

3. A multiprocessor system comprising:

a plurality of vector processors;

at least one common vector register, connected to said vector processors, for holding vector data comprised of a plurality of vector data elements;

means for individually indicating a status of each of said vector data elements held in said common vector register, said status being indicative of accessibility of each of said vector data elements in said common vector register; and means for accessing said common vector register from one of said vector processors in connection with a vector data element having a status indicated by said status indicating means as being accessible; and control means for allowing a vector data element to be written into said common vector register irrespective of the status indicated by said indicating means, control means for allowing a vector data element to be read from said common vector register in accordance with the status of the vector data element indicated by said indicating means, and means for controlling said writing and reading so as to be performed in parallel.

4. A multiprocessor system, comprising:

a plurality of vector processors;

at least one common vector register, connected to said vector processors, for holding vector data comprised of a plurality of vector data elements;

means for individually indicating a status of each of said vector data elements held in said common vector register, said status being indicative of accessibility of each of said vector data elements in said common vector register; and means for accessing said common vector register from one of said vector processors in connection with a vector data element having a status indicated by said status indicating means as being accessible, in which there are at least first and second common vector registers, and further comprising means for performing synchronization and communication among a first group of vector processors using said first common vector register, and means for performing synchronization and communication among a second group of vector processors using said second common vector register.

5. A multiprocessor system according to claim 4, further comprising means responsive exclusively to a system program for designating a vector processor which is allowed to access a particular common vector register.

6. A multiprocessor system comprising:

a plurality of vector processors;

at least one common vector register, connected to said vector processors, for holding vector data comprised of a plurality of vector data elements;

means for individually indicating a status of each of said vector data elements held in said common vector register, said status being indicative of accessibility of each of said vector data elements in said common vector register; and means for accessing said common vector register from one of said vector processors in connection with a vector data element having a status indicated by said status indicating means as being accessible; and first control means for allowing a vector data element to be read from said common vector register;

second control means for allowing a vector data element to be written into said common vector register in accordance with a status indicated by said indicating means; and means for controlling said reading and writing so as to be performed in parallel.

7. A multiprocessor system comprising:

a plurality of vector processors;

a plurality of common vector registers each for holding vector data comprised of a set of vector elements;

control means connected to said vector processors and said common vector registers and responsive to execution by a first one of the vector processors of a common vector register write requesting instruction for writing first vector data provided by said first vector processor into a first one of the common vector registers designated by the instruction, and responsive to execution by a second one of the vector processors of a common vector register read requesting instruction for reading out second vector data from a second one of the common vector registers designated by the instruction and for transferring the read out second vector data to the second vector processor;

wherein said control means includes:

(i) a plurality of interface means each connected to a corresponding one of the vector processors, each for receiving vector data to be written into one of said common vector registers from said corresponding vector processor and each for transferring vector data read out from one of said common vector registers to said corresponding vector processor; and (ii) path select means connected to said plurality of interface means and said common vector registers and responsive to execution by one of said vector processors of a common vector register write requesting instruction for selectively transferring vector data received by one of said plurality of interface means corresponding to said one vector processor, to one of said common vector registers designated by the instruction and responsive to execution by said one vector processor, of a common vector register read requesting instruction for selectively transferring vector data read out from one of said common vector registers designated by the instruction, to said one corresponding interface means, so as to be transferred to said one vector processor.

8. A multiprocessor system comprising:

a plurality of vector processors;

a plurality of common vector registers each for holding vector data comprised of a set of vector elements;

control means connected to said vector processors and said common vector registers and responsive to execution by a first one of the vector processors of a common vector register write requesting instruction for writing first vector data provided by said first vector processor into a first one of the common vector registers designated by the instruction, and responsive to execution by a second one of the vector processors of a common vector register read requesting instruction for reading out second vector data from a second one of the common vector registers designated by the instruction and for transferring the read out second vector data to the second vector processor;

wherein each of the vector processors includes:

(i) a plurality of private vector registers connected to the common vector registers each for holding vector data comprised of a set of vector elements; and (ii) means responsive to a common vector register read requesting instruction of a first kind among instructions executed by the vector processor for reading out vector data from a private vector register designated by the instruction among the private vector registers included in the vector processor and for providing said control means with the read out vector data so as to be written by said control means into a common vector register designated by the instruction and responsive to a common vector register read requesting instruction of a first kind among the instructions executed by the vector processor for writing vector data read out by said control means from a common vector register designated by the instruction means, into a private vector register designated by the instruction, among the private vector registers included in the vector processor.

9. A multiprocessor system according to claim 8, further comprising:

a main storage connected to the vector processors;

wherein each vector processor further includes means responsive to a common vector register write requesting instruction of a second kind among instructions executed thereby for fetching vector elements of vector data to be written into a common vector register designated by the instruction from locations of said main memory designated by the instruction and for providing the read out vector elements to said control means and responsive to a common vector register read requesting instruction of a second kind among the instructions executed thereby for writing vector elements of vector data read out by said control means from a common vector register designated by the instruction, into locations of said main memory designated by the instruction.

10. A multiprocessor system comprising:

a plurality of vector processors;

a plurality of common vector registers each for holding vector data comprised of a set of vector elements;

control means connected to said vector processors and said common vector registers and responsive to execution by a first one of the vector processors of a common vector register write requesting instruction for writing first vector data provided by said first vector processor into a first one of the common vector registers designated by the instruction, and responsive to execution by a second one of the vector processors of a common vector register read requesting instruction for reading out second vector data from a second one of the common vector registers designated by the instruction and for transferring the read out second vector data to the second vector processor;

wherein said control means further includes:

means for indicating one or plural vector processors which has an access right to a respective one of said common vector registers; and means connected to said vector processors and said identifying means and responsive to execution by one of said vector processors, of one of a common vector register write requesting instruction and a common vector register read requesting instruction for sustaining access to a common vector register designated by said one instruction, when said identifying means does not indicate that the one vector processor has an access right to said designated common vector register.

11. A multiprocessor system according to claim 10, wherein said identifying means comprise a plurality of means each provided for a corresponding one of the common vector registers each for identifying an access right by each of the vector processors to said corresponding common vector register.

12. A multiprocessor system according to claim 10, wherein said control means further includes means connected to said vector processors and responsive to execution by one of said vector processors, of an access right instruction for changing one or plural vector processors identified by said identifying means as having an access right to one of the common vector registers designated by the instruction to one or plural new vector processors designated by the instruction.

13. A multiprocessor system according to claim 12, further comprising:

a main storage connected to said vector processors;

wherein said one vector processor has means responsive to said access right instruction for fetching data which indicates the one or plural new vector processors from a location of said main storage designated by the instruction and for providing the fetched data to said changing means so as to inform said changing means of said one or plural new vector processors.

14. A multiprocessor system according to claim 10, wherein said control means further includes means responsive to a first execution by one of the vector processors, of a common vector register write requesting instruction designating one of the common vector registers and responsive to a second execution concurrent to the first execution, by another one of the vector processor, of a common vector register read requesting instruction designating the common vector register and requesting read out of vector data for performing read out of vector data from the one common vector register for the common vector register read requesting instruction in parallel to writing of the vector data into the one common vector register for the common vector register write requesting instruction.

15. A multiprocessor system according to claim 14, wherein said control means includes means for reading each vector element of the vector data from the one common vector register for the common vector register read requesting instruction, after detecting that the vector element has been written into the one common vector register by the common vector register write requesting instruction.

16. A multiprocessor system according to claim 10, wherein said control means further includes:
 a plurality of means each provided for a corresponding one of the common vector registers, each for holding a group of access control data each for one of vector element holding locations within the corresponding common vector register; and
 means connected to said plurality of holding means and responsive to one of a common vector register write requesting instruction and a common vector register read requesting instruction for determining one of execution and suspension of an access to be done to each vector element holding location within a common vector register designated by the one instruction, depending upon one access control data held for the vector element holding location, among a group of access control data held by one of said plurality of holding means corresponding to said designated common vector register.

17. A multiprocessor system according to claim 16, wherein said determining means includes means for performing determination of the one of execution and suspension, depending upon an access control data designated by the instruction and one access control data held for the vector element holding location.

18. A multiprocessor system according to claim 17, wherein said performing means includes means for comparing said access control data designated by the instruction with the one access control data and for allowing an access to the vector element holding location, when a coincidence is found as a result of the comparing operation.

19. A multiprocessor system according to claim 16, wherein said determining means includes means for sequentially performing determination of one of execution and suspension of an access to vector element holding locations within the designated common vector register and for delaying the determination for subsequent ones of the locations, when suspension is determined for one of the locations, until execution of an access is later determined for the one location.

20. A multiprocessor system according to claim 16, wherein said control means further includes means responsive to the one instruction for rewriting each of the group of access control data held by said corresponding holding means to another value, after a corresponding vector element holding location of the designated common vector register has been accessed for the one instruction at the earliest.

21. A multiprocessor system according to claim 20, wherein said another value is a value designated by the one instruction.

22. A multiprocessor system according to claim 20, wherein said rewriting means includes means for rewriting each of the group of access control data in synchronism with execution of access to a corresponding vector element holding location of the designated common vector register.

23. A multiprocessor system comprising:
 a plurality of vector processors;
 a plurality of common vector registers each for holding vector data comprised of a set of vector elements;
 control means connected to said vector processors and said common vector registers and responsive to a first execution by a first one of the vector processors, of a common vector register write requesting instruction for writing first vector data provided by said first vector processor into a first one of the common vector registers designated by the instruction and responsive to a second execution by a second one of the vector processors, of a common vector register read requesting instruction for reading out second vector data from a second one of the common vector processors designated by the instruction and for transferring the read out second vector data to the second vector processor, said control means including timing means responsive to concurrency of the first execution and the second execution for performing read out of vector data from the one common vector register for the common vector register read requesting instruction in parallel to writing of the vector data into the one common vector register for the common vector register write requesting instruction.

24. A multiprocessor system according to claim 23, wherein said timing means includes means for reading each vector element of the vector data from the one common vector register for the common vector register read requesting instruction, after detecting that the vector element has been written into the one common vector register by the common vector register write requesting instruction.

25. A multiprocess system, comprising:
 a plurality of vector processors;
 a plurality of common vector registers each for holding vector data comprised of a set of vector elements;
 control means connected to said vector processors and said common vector registers and responsive to a first execution by a first one of the vector processors, of a common vector register write requesting instruction for writing first vector data provided by said first vector processor into a first one of the common vector registers designated by the instruction and responsive to a second execution by a second one of the vector processors, of a common vector register read requesting instruction for reading out second vector data from a second one of the common vector processors designated by the instruction and for transferring the read out second vector data to the second vector processor, said control means including:
 a plurality of means each provided for a corresponding one of the common vector registers, each for holding a group of access control data each for one of vector element holding locations within the corresponding common vector register; and
 means connected to said plurality of holding means and responsive to one of a common vector register writer requesting instruction and a common vector register read requesting instruction for determining one of execution and suspension of an access to be done to each vector element holding location within a common vector register designated by the one instruction, depending upon one access control data held for the vector element holding location, among a group of access control data held by one of said plurality of holding means corresponding to said designated common vector register.

26. A multiprocessor system according to claim 25, wherein said determining means includes means for performing determination of the one of execution and suspension, depending upon an access control data designated by the instruction and the one access control data held for the vector element holding location.

27. A multiprocessor system according to claim 26, wherein said performing means includes means for comparing said access control data designated by the instruction with the one access control data and for allowing an access to the vector element holding location, when a coincidence is found as a result of the comparing operation.

28. A multiprocessor system according to claim 25, wherein said determining means includes means for sequentially performing determination of one of execution and suspension of an access to vector element holding locations within the designated common vector register and for delaying the determination for subsequent ones of the locations, when suspension is determined for one of the locations, until execution of an access is later determined for the one location.

29. A multiprocessor system according to claim 25, wherein said control means further includes means responsive to the one instruction for rewriting each of the group of access control data held by said corresponding holding means to another value, after a corresponding vector element holding location of the designated common vector register has been accessed for the one instruction at the earliest.

30. A multiprocessor system according to claim 29, wherein said another value is a value designated by the one instruction.

31. A multiprocessor system according to claim 29, wherein said rewriting means includes means for rewriting each of the group of access control data in synchronism with execution of access to a corresponding vector element holding location of the designated common vector register.

32. A multiprocessor system according to claim 25, wherein said control means further includes:
a plurality of interface means each connected to a corresponding one of the vector processors each for receiving vector data to be written into one of said common vector registers from said corresponding vector processor and each for transferring vector data read out from one of said common vector registers to said corresponding vector processor;
path select means connected to said plurality of interface means and said common vector registers and responsive to execution by one of said vector processors of common vector register write requesting instruction for selectively transferring vector data received by one of said plurality of interface means corresponding to said one vector processor, to one of said common vector registers designated by the instruction and responsive to execution by said one vector processor, of a common vector register read requesting instruction for selectively transferring vector data read out from one of said common vector registers designated by the instruction, to said one corresponding interface means, so as to be transferred to said one vector processor.

33. A multiprocessor system according to claim 25, wherein each of the vector processors includes:
a plurality of private vector registers connected to the common vector registers each for holding vector data comprised of a set of vector elements; and
means responsive to a common vector register read requesting instruction of a first kind among instructions executed by the vector processor for reading out vector data from a private vector register designated by the instruction among the private vector registers included in the vector processor and for providing said control means with the read out vector data so as to be written by said control means into a common vector register designated by the instruction and responsive to a common vector register read requesting instruction of a first kind among the instructions executed by the vector processor for writing vector data read out by said control means from a common vector register designated by the instruction means, into a private vector register designated by the instruction, among the private vector registers included in the vector processor.

34. A multiprocessor system according to claim 33, further comprising:
a main storage connected to the vector processors;
wherein each vector processor further includes means responsive to a common vector register write requesting instruction of a second kind among instructions executed thereby for fetching vector elements of vector data to be written into a common vector register designated by the instruction from locations of said main memory designated by the instruction and for providing the read out vector elements to said control means and responsive to a common vector register read requesting instruction of a second kind among the instruction executed thereby for writing vector elements of vector data read out by said control means from a common vector register designated by the instruction, into locations of said main memory designated by the instruction.

35. A multiprocessor system, comprising:
a plurality of vector processors;
at least one common vector registers for holding vector data comprised of a set of vector elements;
control means connected to said vector processors and said common vector register and responsive to a first execution by a first one of the vector processors, of a common vector register write requesting instructing for writing vector data provided by said first vector processor into the common vector register and responsive to a second execution by a second one of the vector processors, of a common vector register read requesting instruction for reading out vector data from the common vector register and for transferring the read out vector data to the second vector processor, said control means including means responsive to concurrency of the first and second execution for performing read out of vector data from the common vector register for the common vector register read requesting instruction in parallel to writing of the vector data into the one common vector register for the common vector register write requesting instruction.

36. A multiprocessor system according to claim 35, wherein said control means includes means for reading each vector element of the vector data from the one common vector register for the common vector register read requesting instruction, after detecting that the vector element has been written into the common vector register by the common vector register write requesting instruction.

37. A multiprocessor system, comprising:
a plurality of vector processors;
at least one common vector registers for holding vector data comprised of a set of vector elements;
control means connected to said vector processors and said common vector register and responsive to a first execution by a first one of the vector processors, of a common vector register write requesting instruction for writing vector data provided by said first vector processor into the common vector register and responsive to a second execution by a second one of the vector processors, of a common vector register read requesting information for reading out vector data from the common vector register and for transferring the read out vector data to the second vector processor, said control means further including:
means for holding a group of access control data each for one of vector element holding locations within the common vector register; and
means connected to said holding means and responsive to one of a common vector register write requesting instruction and a common vector register read requesting instruction for determining one of execution and suspension of an access to be done to each vector element holding location within the common vector register designated by the one instruction, depending upon one access control data held for the vector element holding location, among a group of access control data held by said holding means.

38. A multiprocessor system according to claim 37, wherein said determining means includes means for performing determination of the one of execution and suspension, depending upon an access control data designated by the instruction and the one access control data held for the vector element holding location.

39. A multiprocessor system according to claim 38, wherein said performing means includes means for comparing said access control data designated by the instruction with the one access control data and for allowing an access to the vector element holding location, when a coincidence is found as a result of the comparing operation.

40. A multiprocessor system according to claim 37, wherein said determining means includes means for sequentially performing determination of one of execution and suspension of an access to vector element holding locations within the common vector register and for delaying the determination for subsequent ones of the locations, when suspension is determined for one of the locations, until execution of an access is later determined for the one location.

41. A multiprocessor system according to claim 37, wherein said control means further includes means responsive to the one instruction for rewriting each of the group of access control data held by said holding means to another value, after a corresponding vector element holding location of the common vector register has been accessed for the one instruction at the earliest.

42. A multiprocessor system according to claim 41, wherein said another value is a value designated by the one instruction.

43. A multiprocessor system according to claim 41, wherein said rewriting means includes means for rewriting each of the group of access control data in synchronism with execution of access to a corresponding vector element holding location of the common vector register.

44. A multiprocessor system according to claim 37, wherein each of the vector processors includes:
a plurality of private vector registers connected to the common vector registers each for holding vector data comprised of a set of vector elements; and
means responsive to a common vector register read requesting instruction of a first kind among instructions executed by the vector processor for reading out vector data from a private vector register designated by the instruction among the private vector register designated by the instruction among the private vector registers included in the vector processor and for providing said control means with the read out vector data as to be written by said control means into the common vector register and responsive to a common vector register read requesting instruction of a first kind among the instructions executed by the vector processor for writing vector data read out by said control means from the common vector register, into a private vector register designated by the instruction, among the private registers included in the vector processor.

45. A multiprocessor system according to claim 44, further comprising:
a main storage connected to the vector processors;
wherein each vector processor further includes means responsive to a common vector register write requesting instruction of a second kind among instructions executed thereby for fetching vector elements of vector data to be written into the common vector register from locations of said main memory designated by the instruction and for providing the read out vector elements to said control means and responsive to a common vector register read requesting instruction of a second kind among the instructions executed thereby for writing vector elements of vector data read out by said control means from the common vector register, into locations of said main memory designated by the instruction.

* * * * *